US008971281B2

(12) United States Patent
Yi et al.

(10) Patent No.: US 8,971,281 B2
(45) Date of Patent: *Mar. 3, 2015

(54) METHOD FOR TRANSMITTING MAC PDUS

(71) Applicant: LG Electronics Inc., Seoul (KR)

(72) Inventors: Seung-June Yi, Anyang (KR);
Sung-Jun Park, Anyang (KR);
Young-Dae Lee, Anyang (KR);
Sung-Duck Chun, Anyang (KR)

(73) Assignee: LG Electronics Inc., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/191,307

(22) Filed: Feb. 26, 2014

(65) Prior Publication Data
US 2014/0177570 A1  Jun. 26, 2014

Related U.S. Application Data

(63) Continuation of application No. 13/181,023, filed on Jul. 12, 2011, now Pat. No. 8,687,577, which is a continuation of application No. 12/457,651, filed on Jun. 17, 2009, now Pat. No. 8,094,618.

(60) Provisional application No. 61/074,998, filed on Jun. 23, 2008, provisional application No. 61/073,743, filed on Jun. 18, 2008.

(30) Foreign Application Priority Data

Jun. 16, 2009 (KR) .......................... 10-2009-0053409

(51) Int. Cl.
*H04W 72/10* (2009.01)
*H04W 4/00* (2009.01)
*H04L 5/00* (2006.01)
*H04W 72/04* (2009.01)

(52) U.S. Cl.
CPC ............. *H04L 5/0053* (2013.01); *H04W 72/10* (2013.01); *H04W 72/0406* (2013.01)
USPC .... 370/329; 370/395.42; 370/444; 455/452.1

(58) Field of Classification Search
None
See application file for complete search history.

(56) References Cited

U.S. PATENT DOCUMENTS 6,594,240 B1   7/2003   Chuah et al.
6,785,548 B2   8/2004   Moulsley et al.

(Continued)

FOREIGN PATENT DOCUMENTS

CN   1315099 A    9/2001
CN   101188852 A   5/2008

(Continued)

OTHER PUBLICATIONS

Nokia Corporation, et.al., Message 3 Definition, 3GPP TSG-RAN2 Meeting #64, R2-086077, Oct. 14, 2008.

(Continued)

*Primary Examiner* — Habte Mered
(74) *Attorney, Agent, or Firm* — McKenna Long & Aldridge LLP

(57) ABSTRACT

With respect to generating and sending a MAC PDU by using the radio resources allocated to the mobile terminal, the level of priority between the buffer status report (BSR) and the established logical channels are defined such that the data of each logical channel and buffer status report can be more effectively, efficiently and quickly transmitted.

4 Claims, 8 Drawing Sheets

(56) References Cited

U.S. PATENT DOCUMENTS

| | | |
|---|---|---|
| 6,836,469 B1 | 12/2004 | Wu |
| 7,075,971 B2 | 7/2006 | Parsa et al. |
| 7,986,946 B2 | 7/2011 | Pettersson |
| 2001/0043582 A1 | 11/2001 | Nakada |
| 2002/0009067 A1 | 1/2002 | Sachs et al. |
| 2002/0154653 A1 | 10/2002 | Benveniste |
| 2002/0167920 A1 | 11/2002 | Miyazaki et al. |
| 2003/0095534 A1 | 5/2003 | Jiang |
| 2004/0147276 A1 | 7/2004 | Gholmieh et al. |
| 2004/0185892 A1 | 9/2004 | Iacono et al. |
| 2005/0014508 A1 | 1/2005 | Moulsley et al. |
| 2005/0078641 A1 | 4/2005 | Kim |
| 2005/0117675 A1 | 6/2005 | Das et al. |
| 2005/0141436 A1 | 6/2005 | Dick et al. |
| 2005/0249123 A1 | 11/2005 | Finn |
| 2006/0013182 A1 | 1/2006 | Balasubramanian et al. |
| 2006/0013268 A1 | 1/2006 | Terry |
| 2006/0280145 A1 | 12/2006 | Revel et al. |
| 2007/0206531 A1 | 9/2007 | Pajukoski et al. |
| 2008/0008212 A1 | 1/2008 | Wang et al. |
| 2008/0096563 A1 | 4/2008 | Fischer et al. |
| 2008/0098234 A1 | 4/2008 | Driscoll et al. |
| 2008/0186892 A1 | 8/2008 | Damnjanovic |
| 2008/0188247 A1 | 8/2008 | Worrall |
| 2008/0192766 A1 | 8/2008 | Ranta-Aho et al. |
| 2008/0207150 A1 | 8/2008 | Malladi |
| 2008/0232317 A1 | 9/2008 | Jen |
| 2008/0310396 A1 | 12/2008 | Park |
| 2008/0313300 A1 | 12/2008 | Alanara et al. |
| 2008/0316961 A1 | 12/2008 | Bertrand et al. |
| 2009/0086671 A1 | 4/2009 | Pelletier et al. |
| 2009/0088195 A1 | 4/2009 | Rosa et al. |
| 2009/0156194 A1 | 6/2009 | Meylan |
| 2009/0175187 A1 | 7/2009 | Jersenius et al. |
| 2009/0186624 A1 | 7/2009 | Cave et al. |
| 2009/0213968 A1 | 8/2009 | Tormalehto |
| 2009/0225711 A1 | 9/2009 | Sammour et al. |
| 2009/0232076 A1 | 9/2009 | Kuo |
| 2009/0300457 A1 | 12/2009 | Kuo |
| 2009/0303954 A1 | 12/2009 | Guo |
| 2009/0305665 A1 | 12/2009 | Kennedy et al. |
| 2010/0027511 A1 | 2/2010 | Terry |
| 2010/0034162 A1 | 2/2010 | Ou et al. |
| 2010/0080181 A1 | 4/2010 | Yamada et al. |
| 2010/0093386 A1 | 4/2010 | Damnjanovic et al. |
| 2010/0111067 A1 | 5/2010 | Wu |
| 2010/0226325 A1 | 9/2010 | Chun et al. |
| 2010/0281486 A1 | 11/2010 | Lu et al. |
| 2011/0002262 A1 | 1/2011 | Wang et al. |
| 2011/0103499 A1 | 5/2011 | Cheng et al. |

FOREIGN PATENT DOCUMENTS

| | | |
|---|---|---|
| EP | 1 755 355 | 2/2007 |
| EP | 1 973 281 | 9/2008 |
| EP | 2 094 053 | 8/2009 |
| EP | 2 136 599 | 12/2009 |
| JP | 2000-341204 A | 12/2000 |
| JP | 2000-354065 | 12/2000 |
| JP | 2006-166479 | 6/2006 |
| JP | 2007-266733 | 10/2007 |
| JP | 2009303213 A | 12/2009 |
| JP | 2010-518724 A | 5/2010 |
| JP | 2010-541520 | 3/2011 |
| JP | 2011509049 A | 3/2011 |
| KR | 10-0567211 | 4/2006 |
| KR | 10-2006-0048372 | 5/2006 |
| KR | 10-2006-0115175 | 11/2006 |
| KR | 10-2006-0120115 | 11/2006 |
| KR | 10-2007-0107619 | 11/2007 |
| KR | 10-2007-0108300 | 11/2007 |
| KR | 10-2007-0109313 | 11/2007 |
| KR | 10-2008-0016367 | 2/2008 |
| KR | 10-2008-0039177 | 5/2008 |
| KR | 10-2008-0039294 | 5/2008 |
| KR | 10-2008-0049596 | 6/2008 |
| KR | 10-2008-0065880 | 7/2008 |
| KR | 10-2008-0112649 | 12/2008 |
| KR | 10-2009-0014937 | 2/2009 |
| KR | 10-2009-0016069 | 2/2009 |
| KR | 10-2009-0016402 | 2/2009 |
| KR | 10-2009-0084690 | 8/2009 |
| RU | 2233546 | 7/2004 |
| RU | 2332802 | 8/2008 |
| WO | WO 2004/056009 | 7/2004 |
| WO | 2006-118427 A2 | 11/2006 |
| WO | WO 2007/082407 | 7/2007 |
| WO | WO 2007/083230 | 7/2007 |
| WO | 2007091831 A2 | 8/2007 |
| WO | WO 2007/128204 | 11/2007 |
| WO | WO 2007/143916 | 12/2007 |
| WO | WO 2008/024628 | 2/2008 |
| WO | WO 2008/042967 | 4/2008 |
| WO | WO 2008/054112 | 5/2008 |
| WO | 2008/100009 A1 | 8/2008 |
| WO | WO 2008/097023 | 8/2008 |
| WO | WO 2008/097030 | 8/2008 |
| WO | WO 2008/131401 | 10/2008 |
| WO | WO 2008/155469 | 12/2008 |
| WO | WO 2009/005429 | 1/2009 |
| WO | WO 2009/023470 | 2/2009 |
| WO | WO 2009/086188 | 7/2009 |
| WO | WO 2009/088858 | 7/2009 |

OTHER PUBLICATIONS

LG Electronics, Inc., et. al., Counter proposal to R2-090969, Feb. 13, 2009.

Triggers for Power Headroom Reports in EUTRAN Uplink, 3GPP TSG RAN WG1 Meeting #52bis R1-081464, Mar. 31, 2008.

LG Electronics Inc., Nokia Corporation, Nokia Siemens Networks, Samsung, NTT Docomo Inc. "Counter Proposal to R2-090969 on Management for HARQ buffer with TAT." 3GPP TSG-RAN2 Meeting #65; Athens, Greece, Feb. 9-13, 2009; R2-091232; pp. 1-3.

3rd Generation Partnership Project; Technical Specification Group Radio Access Network; Evolved universal Terrestrial Radio Access (E-UTRA) Medium Access control (MAC) protocol specification (Release 8), v8.3.0 (Aug. 2008).

Ericsson, "Correction to UE transmission power headroom report for LTE", May 18-22, 2008, R2-083897.

LG Electronics, "Message 2 Structure with Back-Off Parameters", 3GPP TSG-RAN WG2 #61, R2-081035, Feb. 2008.

LG Electronics, "Discussion on random access back-off procedure", 3GPP TSG-RAN WG2 #60bis, R2-080189, Jan. 2008.

MAC Rapporteurs et al., "E-UTRA MAC protocol specification update", 3GPP TSG-RAN2 meeting #61 bis, R2-081719, Mar.-Apr. 2008.

NTT DoCoMo, Inc., "RA response format", 3GPP TSG RAN WG2 #60bis, R2-080451, Jan. 2008.

LG Electronics Inc., "Missing condition for unsuccessful reception of Msg2", 3GPP TSG-RAN2 meeting #64bis, R2-090323, Jan. 2009.

"3rd Generation Partnership Project; Technical Specification Group Radio Access Network; Evolved Universal Terrestrial Radio Access (E-UTRA) Medium Access Control (MAC) protocol specification (Release 8)", 3GPP TS 36.321, V8.2.0, May 2008, XP050377618. TS 36.321 V8.1.0, Mar. 2008.

Technical Specification Group Radio Access Network; Evolved Universal Terrestrial Radio Access (E-UTRA) Medium Access Control (MAC) protocol specification; (3GPP TS 36.321, Jun. 2008).

Texas Instruments Inc., "Handover Failure Handling", 3GPP TSG-RAN WG2 Meeeting #61, R2-081504, Feb. 2008.

Alcatel-Lucent, "TP on Power Headroom reporting", 3GPP TSG RAN WG2 #62, R2082224, May 2008.

Nokia Corporation et al., "Power Headroom reporting" 3GPP TSG-RAN WG2 Meeting #62, R2-082197, May 2008.

Ericsson, "UE transmission power headroom report for LTE", 3GPP TSG RAN WG2 #62, R2-082147, May 2008.

Nokia Siemens Network et al., "Triggers for Power Headroom Reports in EUTRAN Uplink", 3GPP TSG RAN WG1 #52 Meeting, R2-080947, Feb. 2008.

(56) References Cited

OTHER PUBLICATIONS

Nokia Corporation et al., "Scheduling Information for E-UTRAN uplink", 3GPP TSG-RAN WG2 Meeting #59bis, R2-073909, Oct. 2007.

MAC Rapporteurs, "E-UTRA MAC protocol specification update", 3GPP TSG-RAN2 Meeting #61, R2-081389, Feb. 2008.

Panasonic, "Clarification on 'Active Time' definition", 3GPP TSG RAN WG2 #62, R2-082225, May 2008.

LG Electronics Inc. et al., "Restriction to PDCCH for Contention Resolution", 3GPP TSG-RAN WG2 #62, R2-082509, May 2008.

LG Electronics Inc., "DL Grant in Random Access Response", 3GPP TSG-RAN WG2 #60, R2-074787, Nov. 2007.

ETSI TS 136 300 V8.4.0, "Evolved Universal Terrestrial Radio Access (E-UTRA) and Evolved Universal Terrestrial Radio Access (E-UTRAN); Overall Description; Stage 2", XP014041816, Apr. 2008.

Sunplus mMobile Inc., "Align the DRX Active Time with RA procedure", 3GPP TSG-RAN WG2 Meeting #62bis, R2-083428, Jul. 2008.

LG Electronics Inc., "Correction to DRX", 3GPP TSG-RAN2 Meeting #62bis, R2-083274, Jun.-Jul. 2008.

LG Electronics, "Corrections to the Random Access Response reception", 3GPP TSG-RAN WG2 #62, R2-082447, May 2008.

LG Electronics Inc., "Correction to RACH Procedure", 3GPP TSG-RAN2 Meeting #64, R2-086137, Nov. 2008.

LG Electronics Inc., "Correction to Multiplexing Procedure for BSR", 3GPP TSG-RAN2 Meeting #62bis, R2-083275, Jun.-Jul. 2008.

Infineon, "TP for the UL logical channel prioritization", 3GPP TSG RAN WG2 Meeting #62, R2-082504, May 2008.

LG Electronics Inc., "BSR priority", 3GPP TSG-RAN WG2 #61bis, R2-081589, Apr. 2008.

MAC Rapporteurs, "36.321 CR covering agreements of RAN2 #61bis and RAN2#62", 3GPP TSG-RAN2 Meeting #62, R2-082902, May 2008.

Panasonic, "Priority handling of MAC Control Elements", 3GPP TSG RAN WG2#62, R2-082227, XP-002537451, May 2008.

CR Covering agreements of RAN 2 #61bis; 3GPP Draft; R2-082049; XP050139679; Apr. 2008.

Disassembly, Demultiplexing and Multiplexing Functions; #GPP Draft; R2-091633; XP050323507; Feb. 2009.

3GPP TS 36,321 V8.1.0 (Mar. 2008).

ETSI! TS 136 300 V8.4.0 (Apr. 2008), 4 Pages.

Dalman et al., "3G Evolution HSPA and LTE for Mobile Broadband", Elseview, edition 2, p. 441 (2008).

LG Electronics Inc. et al., "Reflection of RAN1 LS on timing adjust and addition of MAC in random access response", 3GPP TSG-RAN2 Meeting #64 R2-086374, Nov. 14, 2008.

Huawei, "Corrections to Random Access Procedure", 3GPP TSG-RAN WG2 Meeting #64 R2-087042, Nov. 14, 2008.

HTC Corporation, "Disassembly, Demultiplexing and Multiplexing functions", 3GPP TSG-RAN2 Meeting #65, Athens, Greece, Feb. 9-13, 2009, R2-090988.

MAC Rapporteurs (Qualcomm Europe, Ericsson), "36.321 CR covering agreements of RAN2 #61 bis and RAN2#62", 3GPP TSF-RAN2 Meeting #62, Kansas City, Missouri, May 5-9, 2008, R2-082902.

LG Electronics Inc., Correction to RACH Procedure, 3GPP TSG-RAN2 Meeting #64 R2-087070, Nov. 10-14, 2008.

3GPP TS 36.523-1 V8.0.0, User Equipment (UE) conformance specification, Part 1: Protocol conformance specification, 2008.

3GPP TSF-RAN2 Meeting #62bis, Correction to MAC PDU Format for Random Access Response, LG Electronics Inc., Apr. 7, 2008, R2-083370.

METHOD FOR TRANSMITTING MAC PDUS

CROSS-REFERENCE

This application claims the benefit of, and is a continuation of, U.S. application Ser. No. 13/181,023, filed Jul. 12, 2011, which is a continuation of U.S. application Ser. No. 12/457,651, filed Jun. 17, 2009, and claims priority benefit of U.S. Provisional Application Nos. 61/073,743, filed Jun. 18, 2008, 61/074,998, filed Jun. 23, 2008, and Korean Patent Application No. 10-2009-0053409, filed Jun. 16, 2009, each of these applications is incorporated by reference for all purposes as if fully set forth herein.

BACKGROUND

The present invention relates to an apparatus and method for transmitting MAC PDUs to handle buffer status report (BSR) priority for CCCH transmissions. In the related art, buffer status reports (BSR) were transmitted from the mobile terminal in a certain manner. However, the related art technologies do not sufficiently address how buffer status reports (BSR) can be transmitted more quickly and efficiently, and thus do not offer appropriate solutions.

SUMMARY

The present inventors recognized at least the above-identified drawbacks of the related art. Based upon such recognition, the various features described hereafter have been conceived for transmitting and receiving data between a base station and a mobile terminal in a Long Term Evolution (LTE) system. In particular, for transmitting the data stored in its buffer, the mobile terminal sends its buffer state information (i.e. buffer status report: BSR). As a result, the mobile terminal performs effective multiplexing of the data accumulated for each logical channel and the BSR to be transmitted, such that the BSR is more quickly and efficiently sent and data block configuration (i.e., PDU assembly, PDU generation, etc.) can be achieved.

DETAILED DESCRIPTION

The inventive concepts and features herein are explained in terms of a Long Term evolution (LTE) system or other so-called 4G communication systems, which is an enhancement to current 3GPP technologies. However, such details are not meant to limit the various features described herein, which are applicable to other types of mobile and/or wireless communication systems and methods.

Hereafter, the term "mobile terminal" will be used to refer to various types of user devices, such as mobile communication terminals, user equipment (UE), mobile equipment (ME), and other devices that support various types of wireless communication technologies.

Embodiments of the present invention relate to sending and receiving data between a base station (e.g. Node B, eNB, access point, etc.) and a mobile station (e.g. mobile terminal, UE, user device, etc.) in a Long Term Evolution (LTE) system. Power consumption of the mobile terminal can be reduced to a minimum and a downlink channel can be more effectively monitored because a reception time for the downlink channel is determined according to the characteristics of a preamble for a mobile terminal that performs random access.

Second generation (2G) mobile communications relate to transmitting and receiving voice signals in a digital manner, and include technologies such as CDMA, GSM, and the like. As an enhancement from GSM, GPRS was developed to provide packet switched data services based upon GSM.

Third generation (3G) mobile communications relate to transmitting and receiving not only voice signals, but also video and data. The 3GPP (Third Generation Partnership Project) developed the IMT-2000 mobile communication system and selected WCDMA as its radio access technology (RAT). The combination of IMT-2000 and WCDMA can be referred to as UMTS (Universal Mobile Telecommunications System), which comprises a UMTS Terrestrial Radio Access Network (UTRAN).

As data traffic is expected to increase dramatically, the standardization for $3^{rd}$ generation mobile communications is underway to establish a Long-Term Evolution (LTE) network that supports greater bandwidth. LTE technologies are employed for an Evolved-UMTS (E-UMTS), which has an Evolved-UTRAN (E-UTRAN) that uses OFDMA (Orthogonal Frequency Division Multiple Access) as its radio access technology (RAT).

Figure 1:
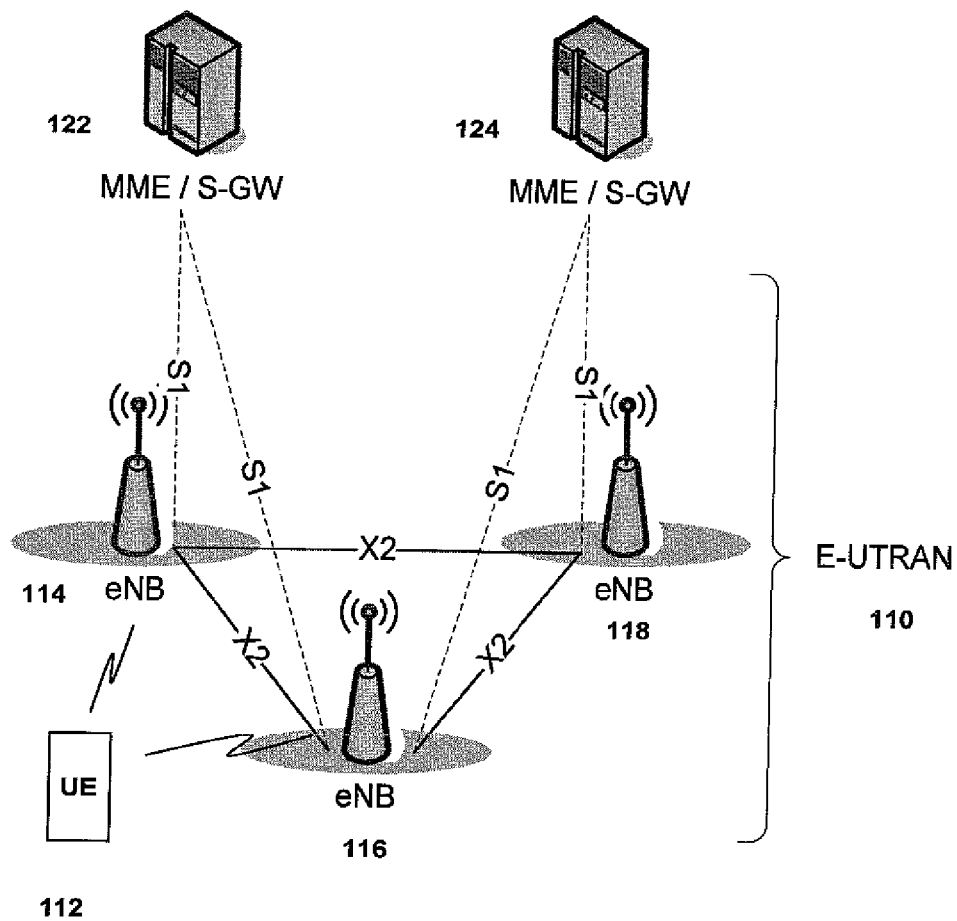
FIG. 1 shows an exemplary network architecture for an E-UMTS (Evolved Universal Mobile Telecommunications System).

FIG. 1 shows the exemplary network architecture for an E-UMTS (Evolved Universal Mobile Telecommunications System) 100, which is a type of mobile communications system. The E-UMTS system is a system that has evolved from the UMTS system and its basic standardization tasks are now being performed by the 3GPP organization. The E-UMTS system can be said to be a Long Term Evolution (LTE) system, which is a type of so-called 4G or next generation system that has evolved from the current 3G mobile communication systems.

The E-UMTS network 100 can be generally distinguished into the E-UTRAN (Evolved Universal Terrestrial Radio Access Network) 110 and the CN (core network). The E-UTRAN is comprised of a mobile terminal 112 (e.g. user equipment (UE), mobile station, handset, mobile phone, etc.), a base station 114, 116, 118 (e.g., an eNode B, access point (AP), network node, etc.) a serving gateway (S-GW) 122, 124 located at an end of the network for connection with an external network, and a mobility management entity (MME) 122, 124 that manages various mobility aspects of the mobile terminal. For a single eNode B, one or more cells (or regions, areas, etc.) may exist.

Figure 2:
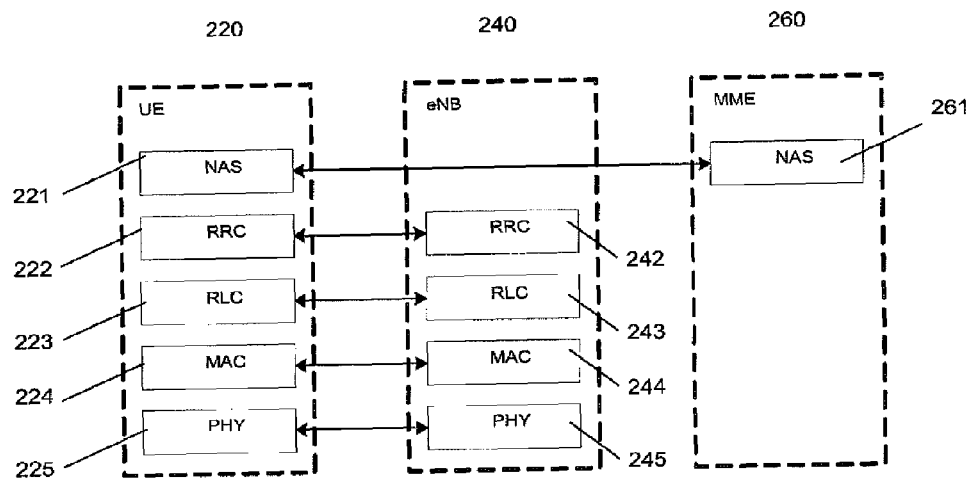
FIG. 2 shows an exemplary radio interface protocol architecture for the control plane between the mobile terminal (UE) and the network (eNB, MME).
Figure 3:
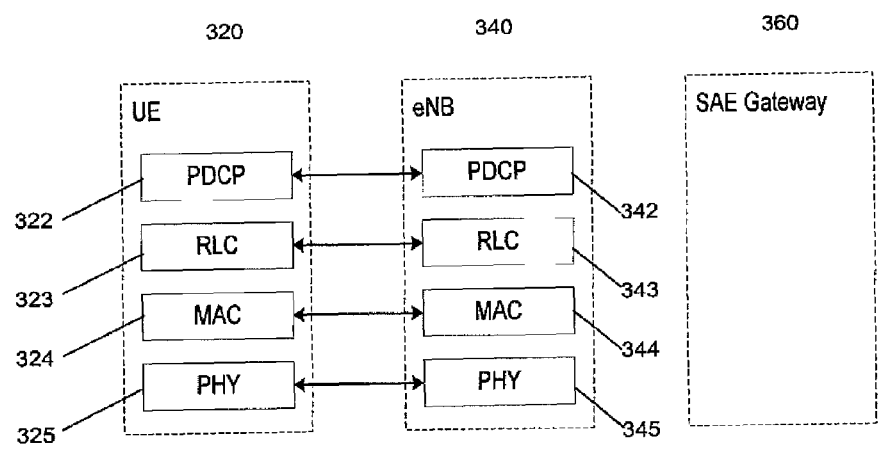
FIG. 3 shows an exemplary radio interface protocol architecture for the user plane between the mobile terminal (UE) and the network (eNB, SAE Gateway).

FIGS. 2 and 3 show the radio interface protocol between the mobile terminal and base station based on the 3GPP radio access network standard. This radio interface protocol is divided horizontally into a physical layer, a data link layer, and a network layer, and is divided vertically into a user plane for transmitting data information and a control plane for transferring control signals (signaling). These protocol layers can be divided into L1 (Layer 1), L2 (Layer 2), and L3 (Layer 3), which are the lower three layers of the OSI (Open System Interconnection) standard model, which is well known in communication systems.

Hereafter, the control plane of the radio protocol in FIG. 2 and the user plane of the radio protocol in FIG. 3 will be described respectively.

In Layer 1, the physical layer 225-245, 325-345 uses one or more physical channels to provide an information transfer service. The physical layer is connected to the MAC (Medium Access Control) layer 224-244, 324-344 located above via one or more transport channels, and data is transferred between the MAC layer and the physical layer through these transport channels. Also, between respectively different physical layers, such as the physical layer in the transmitter (transmitting side) and the physical layer in the receiver (receiving side), data is transferred via one or more physical channels.

The physical channels that exist for the physical layer in the transmitting side and in the receiving side include: SCH (Synchronization Channel), PCCPCH (Primary Common Control Physical Channel), SCCPCH (Secondary Common Control Physical Channel), DPCH (Dedicated Physical Channel), PICH (Paging Indicator Channel), PRACH (Physical Random Access Channel), PDCCH (Physical Downlink Control Channel) and PDSCH (Physical Downlink Shared Channel) and the like.

In Layer 2, the MAC layer provides service to a RLC (Radio Link Control) layer 223-243, 323-343, which is an upper layer, via one or more logical channels. Such logical channels can be classified according to the type of data being transmitted, whereby control channels are used to transmit control plane information and traffic channels are used to transmit user plane information.

The RLC layer supports the transmission of data with reliability. Each radio bearer (RB) guarantees a particular QoS (Quality of Service) and handles the transmission of data associated thereto. In order for the RLC layer to guarantee the QoS that is unique to that RB, one or more RLC entities are provided for each RB. Also, several RLC modes (TM: Transparent Mode, UM: Unacknowledged Mode, AM: Acknowledged Mode) are provided to support various QoS requirements.

The PDCP (Packet Data Convergence Protocol) layer 322-342 in Layer 2 performs a header compression function to reduce the header size for Internet Protocol (IP) packets that contain relatively large and unnecessary control information such that IP packets (such as for IPv4, IPv6, etc.) may be effectively transmitted over the radio interface having relatively small bandwidth. Also, the PDCP layer is used for performing coding of control plane (C-plane) data, such as RRC messages. The PDCP layer can also perform coding of user plane (U-plane) data.

Located at the uppermost portion of Layer 3, the RRC (Radio Resource Control) layer 222-242 is only defined in the control plane and is responsible for the control of logical channels, transport channels and physical channels with relation to the configuration, re-configuration and release of radio bearers (RBs). Here, a radio bearer is a service provided by Layer 2 for transferring data between the mobile terminal and E-UTRAN.

Figure 4:
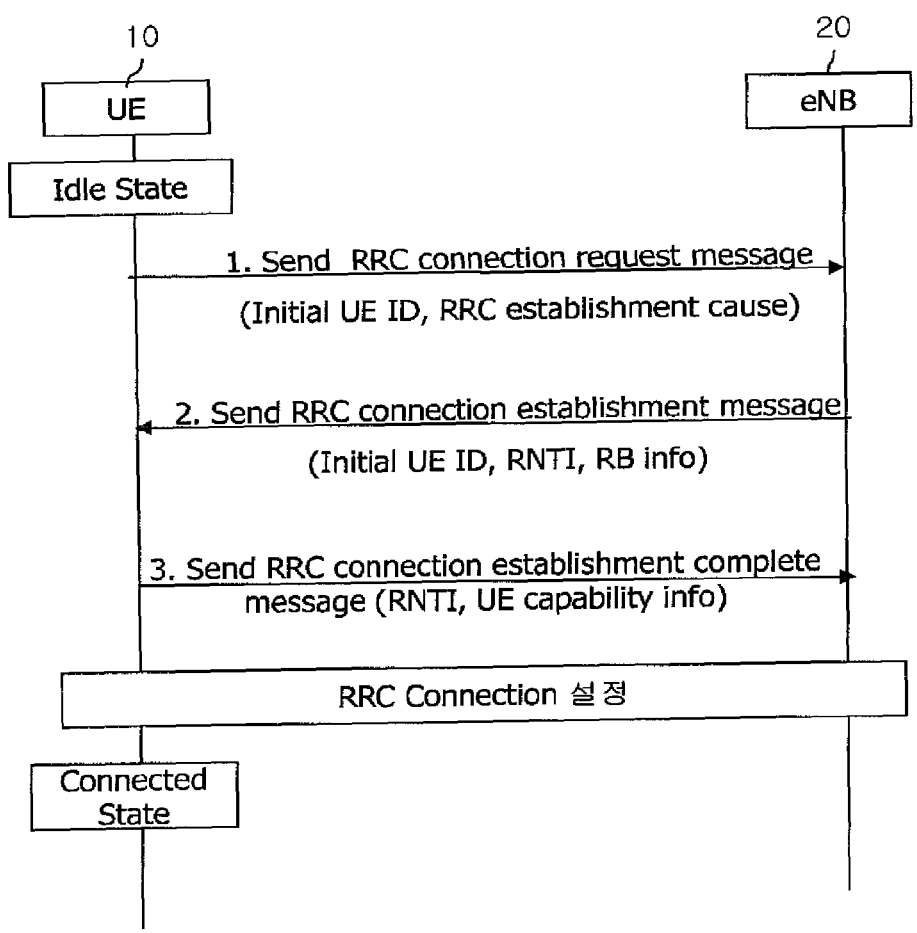
FIG. 4 shows an exemplary signal flow chart for RRC connection procedures.

FIG. 4 shows an exemplary RRC connection procedure that includes the following three steps:

Step (1)

When a mobile terminal in idle state needs to establish an RRC connection for reasons such as making call attempts, responding to paging from the E-UTRAN, etc., the mobile terminal (10) first sends an RRC connection request message to the E-UTRAN (eNB: 20). Here, the RRC connection request message includes an Initial UE Identity and an RRC Establishment Cause (i.e. the reason for requesting connection). The Initial UE Identity is a unique identifier for the mobile terminal that allows that mobile terminal to be identified in any region of the world. There are various types of RRC Establishment Causes, such as call attempts, response to paging, and the like. Together with the transmission of the RRC connection request message, the mobile terminal starts (operates) a timer, and until such timer expires, if an RRC connection setup message or an RRC connection reject message is not received, the RRC connection request message is transmitted repeatedly. The maximum number of RRC connection request messages may be limited to a particular value.

Step (2)

Upon receiving the RRC connection request message from the mobile terminal, the E-UTRAN (eNB: 20) accepts such RRC connection request if radio resources are sufficient, and sends a response (RRC connection setup message) to the mobile terminal. Here, the RRC connection setup message is transmitted upon including an initial mobile terminal identifier, a radio network temporary identifier (i.e. C-RNTI: Cell Radio Network Temporary Identifier), radio bearer establishment information, and the like. The radio network temporary identifier is a mobile terminal identifier allocated to allow the E-UTRAN to distinguish mobile terminals in connected state, and used only when an RRC connection exists, and is also only used within the E-UTRAN. After an RRC connection is established, the mobile terminal communicates with the E-UTRAN by using the radio network temporary identifier instead of the initial mobile terminal identifier. This is because the initial mobile terminal identifier is a unique identifier for that mobile terminal, and its frequent usage would increase the possibility of undesirable exposure. Thus, due to such security reasons, the initial mobile terminal identifier is merely used during the RRC connection procedure, while the radio network temporary identifier is used for procedures thereafter.

Step (3)

Upon receiving the RRC connection setup message, the mobile terminal compares the initial mobile terminal identifier included in this message with its own identifier, and checks to see if this received message was intended for itself. If so, the mobile terminal stores the radio network temporary identifier allocated by the E-UTRAN, and uses such to transmit an RRC connection setup complete message to the E-UTRAN. Here, the RRC connection setup complete message includes capability information (e.g., performance, capacity, power, efficiency, etc.) of the mobile terminal. If the mobile terminal succeeds in transmitting the RRC connection setup complete message, then the mobile terminal establishes an RRC connection with the EUTRAN and transitions to its RRC connected state.

In the above procedure, the RRC connection request message is transmitted by using the CCCH. Namely, a mobile terminal in idle mode does not have a DTCH/DCCH, thus only the CCCH can be used. The DTCH/DCCH is only established for a mobile terminal in connected mode. In the above procedure, the mobile terminal can enter its connected mode only upon receiving an RRC connection setup message. As the mobile terminal is not in RRC connected state prior to receiving the RRC connection setup message, the RRC connection setup message is also transmitted via the CCCH. Accordingly, the RRC connection setup complete message is transmitted via the DCCH.

Hereafter, features of the RACH (Random Access CHannel) will be explained. The RACH is used for transmitting data having relatively short length on the uplink, and in particular, is used for a mobile terminal, which did not receive allocation of dedicated radio resources, having a signaling message or user data to be transmitted via the uplink.

Next, the Random Access Procedure provided in an LTE system will be explained.

The mobile terminal performs a random access procedure for at least the following exemplary situations:
  upon performing an initial access when there is no radio resource control (RRC) connection with the base station;
  upon initial access to a target cell while the mobile terminal is in handover;
  upon request by a command of the base station;
  upon generation of data for the uplink, when uplink time synchronization is not correct or when designated radio resources to be used in appropriate requesting radio resources have not yet been allocated;
  during a correction (e.g. decoding, reconstruction, etc.) procedure when there is a radio link failure or handover failure.

Figure 5:
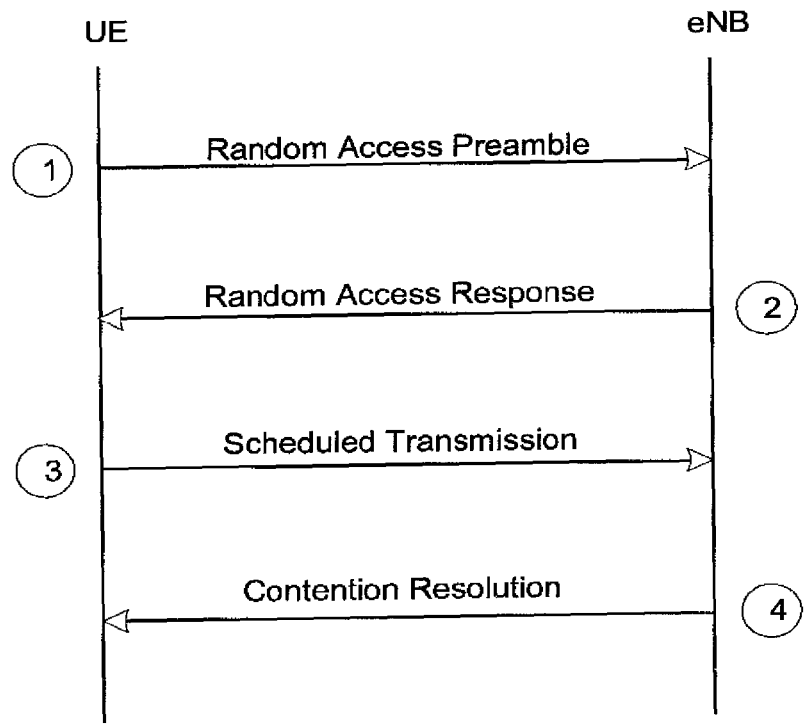
FIG. 5 shows an exemplary signal flow chart for contention based RACH procedures between a UE and a eNB.

Based upon the above explanations, the operations between the mobile terminal and the base station for a contention based random access procedure will be explained with reference to FIG. 5 (that includes steps 1 through 4).

Step (1)

In a contention based random access procedure, the mobile terminal selects (e.g. at random) one random access preamble among a set of random access preambles indicated via system information or a handover command, then selects PRACH resources that can be used to transmit such random access preamble, and then performs transmission. Here, such preamble is called a RACH MSG 1.

Step (2)

After transmitting the random access preamble as selected above, the mobile terminal attempts to receive its random access response within a random access response reception window indicated from the base station via system information or handover command. In more detail, the random access response information (typically called a RACH MSG 2) is transmitted in the form of a MAC PDU, which is delivered via the PDSCH. Also, to allow the mobile terminal to appropriately receive the information transferred via the PDSCH, the PDCCH is also delivered together therewith. Namely, the PDCCH includes information of the mobile terminal that needs to receive the PDSCH, the radio resource frequency and time information of the PDSCH, the PDSCH transmit format, and the like. If the mobile terminal successfully receives the PDCCH that it intended to receive, a random access response transmitted via the PDSCH is appropriately received by using the various information related to the PDCCH. Here, the random access response includes values comprising a random access preamble identifier (ID), a UL Grant (for uplink radio resources), a Temporary C-RNTI (a temporary cell identifier), and a Time Alignment Command (a value for time synchronization adjustment). The random access preamble identifiers are needed because a single random access response may contain random access response information intended for more than one mobile terminal, and thus, indicate which UL Grant, Temporary C-RNTI, and Time Alignment Command information are valid for which mobile terminals.

Step (3)

If the mobile terminal receives a random access response (RAR) that is meant for itself (i.e. the RAR is a valid response for that mobile terminal), the information within such random access response is processed, respectively. Namely, the mobile terminal applies the Time Alignment Command and stores the Temporary C-RNTI. Also, the UL Grant is used to transmit the data stored in its buffer or to transmit newly generated data to the base station. Here, the data transmitted by using the UL Grant (i.e., the MAC PDU) is commonly called RACH MSG 3. Among the data (i.e. RACH MSG 3) included in the UL Grant, the mobile terminal identifier (ID) must be included. This is because in a contention based random access procedure, the base station cannot determine which mobile terminal performed such random access procedure, and in order to prevent or resolve any future contentions or conflicts, information that can be used to identify the mobile terminal would be required.

In the above procedure, there are two ways to include the identifier for the mobile terminal. For the first way, if the mobile terminal already has a valid cell identifier (C-RNTI) allocated from the base station (eNB) of the corresponding cell before the random access procedure is performed, the mobile terminal transmits such cell identifier via the UL Grant. For the second way, if the mobile terminal did not receive allocation of a unique cell identifier from the eNB, the mobile terminal includes its core network identifier (e.g., S-TMSI, Random ID, etc.) and performs transmission. Typically, such unique identifiers have a greater length than a cell ID. After transmitting data using the UL Grant, the mobile terminal starts a contention resolution timer in order to solve any contention (conflict) problems.

Step (4)

After transmitting data (that includes its identifier) using the UL Grant included in the random access response, the mobile terminal waits for commands from the base station for resolving contentions. Namely, reception of the PDCCH is attempted in order to receive a particular message. There are two ways to receive the PDCCH. As stated previously, if the identifier transmitted by using the UL Grant is a cell identifier (C-RNTI), the mobile terminal attempts reception of the PDCCH by using its cell identifier, and if the identifier is a unique identifier, attempt to receive the PDCCH is performed by using the Temporary C-RNTI included in the random access response. Thereafter, for the former situation, if the PDCCH (referred to as RACH MSG 4 hereafter) is received via use of the mobile terminal's cell identifier before expiration of the contention resolution timer, the mobile terminal determines that the random access procedure was performed normally, and ends the random access procedure. For the latter situation, if the PDCCH is received via use of the Temporary cell identifier before expiration of the contention resolution timer, the data (referred to as RACH MSG 4 hereafter) delivered by the PDSCH indicated by the PDCCH is checked. If such data contains a unique identifier intended for that mobile terminal, the random access procedure is considered to have been performed normally, and the random access procedure is ended. The message or MAC PDU received in this step 4) is often called RACH MSG 4.

Figure 6:
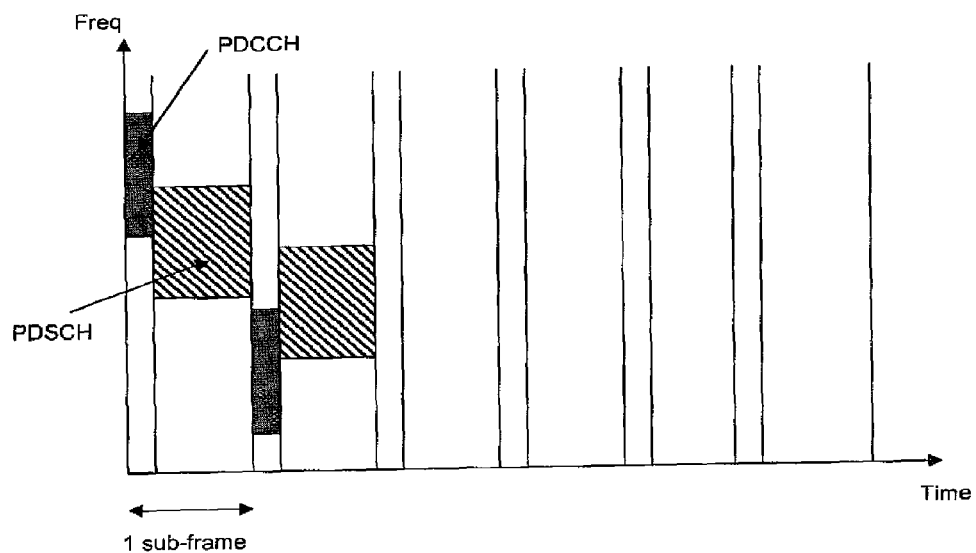
FIG. 6 shows an exemplary relationship among certain channels (PDCCH and PDSCH) between the base station and mobile terminal.

With reference to FIG. 6, a method for the mobile terminal in an LTE system to receive downlink data will be explained.

On the downlink, there are basically two types of physical channels: PDCCH and PDSCH. The PDCCH is not directly related to transmitting user data, but used in transmitting control information needed for implementing (or using) physical channels. In more basic terms, it can be said that the PDCCH is used in controlling other physical channels. In particular, the PDCCH is used in transmitting information necessary for the mobile terminal to receive the PDSCH. With respect to data that is transmitted at a particular point in time using a particular frequency bandwidth, information about what mobile terminal such data is intended for, the size of such data being transmitted, and the like is transmitted via the PDCCH. Accordingly, each mobile terminal receives the PDCCH at a particular time (e.g., TTI: transmission time interval) and checks whether any data (that should be received) was transmitted. If there is an indication that data (which should be received) was indeed transmitted, the PDSCH is additionally received by using the information (such as the appropriate frequency, etc.) indicated by the PDCCH. It can be said that information indicating as to what mobile terminal (i.e. a single UE or multiple UEs) the data of the PDSCH is being transmitted to, information indicating how the mobile terminal(s) should receive and decode the PDSCH data, and the like are transmitted via a physical channel, i.e. the PDCCH (Physical Downlink Control CHannel).

For example, in a particular sub-frame, let us assume that radio resource information A (e.g. frequency location), transmission format information B (e.g. transmission block size, modulation and coding information, etc.), and RNTI (Radio Network Temporary Identity) information C undergo CRC (Cyclic Redundancy Check) masking and transmitted via the PDCCH. One or more mobile terminals in a corresponding cell use the RNTI information that it has in order to monitor the PDCCH, and referring to the above assumption, for a mobile terminal having RNTI information C, when the PDCCH is decoded, CRC errors do not occur. Accordingly, such mobile terminal uses the transmission format information B and radio resource information A to decode the PDSCH in order to receive data. In contrast, with respect to the above assumption, in a mobile terminal that does not have RNTI information C, CRC errors occur when the PDCCH is decoded, and thus such mobile terminal does not receive the PDSCH.

Through the above procedures, in order to inform about which mobile terminals have been allocated radio resources, a RNTI (Radio Network Temporary Identifier) is transmitted via each PDCCH, and such RNTI can be classified as a dedicated RNTI or a common RNTI. A dedicated RNTI is allocated to a single mobile terminal and is used for transmitting and receiving data corresponding to that mobile terminal. Such dedicated RNTI is only allocated to those mobile terminals having their information registered in the base station (eNB). In contrast, a common RNTI is used by those mobile terminals that do not have their information registered in the base station (eNB) and cannot be allocated a dedicated RNTI, in order to send and receive data with the base station or used for transmitting information (such as system information) that is commonly applied to a plurality of mobile terminals.

Hereafter, aspects of the logical channels will be explained. Logical channels are those channels that exist between a MAC entity and an RLC entity. Some examples of logical channels are as follows:

CCCH (Common Control Channel): used when messages cannot be transmitted via the DCCH between the mobile terminal and the eNB.

DCCH (Dedicated Control Channel): if DCCH can be used between the mobile terminal and the eNB, an RRC message is transmitted to a particular mobile terminal via DCCH.

DTCH (Dedicated Transport Channel): all user data used for a particular mobile terminal is transmitted via the DTCH.

Hereafter, the RRC states and RRC connection methods for a mobile terminal will be explained. The RRC state refers to whether or not the RRC of the mobile terminal and the RRC of the E-UTRAN have a logical connection therebetween. The RRC connected state refers to when there is a connection, while the RRC idle state refers to when there is no connection. For a mobile terminal in connected state, an RRC connection exists, the E-UTRAN can determine in which cell such mobile terminal is located in, and thus such mobile terminal can be effectively controlled. In contrast, the E-UTRAN cannot determine a mobile terminal in idle state, and thus such mobile terminal is managed by the core network in terms of the mobile terminal's tracking area, which is a larger region than a cell. Here, a tracking area denotes a set of cells. Namely, the existence of a mobile terminal that is in idle state can be determined only with respect to relatively large regions, and typical mobile communication services including voice and data services can be received by a mobile terminal that changes into a connected state.

When the user first turns on (or powers up) his mobile terminal, a search for an appropriate cell is performed and the mobile terminal remains in idle state with respect to that cell. Only when an RRC connection needs to be made, the mobile terminal in idle state performs an RRC connection procedure such that its RRC establishes a connection with the RRC in the E-UTRAN, and thus transitions to an RRC connected state. A mobile terminal in idle state may require establishment of an RRC connection is various situations, such as when uplink data transmission is required (e.g., when the user wishes to make a call attempt or the like), when transmitting of a response message with respect to a paging message received from the E-UTRAN, or the like. For the mobile terminal in idle state to establish an RRC connection with the E-UTRAN, and RRC connection procedure needs to be performed. The RRC connection procedure basically comprises three steps: the mobile terminal sending an RRC connection request message to the E-UTRAN, the E-UTRAN sending an RRC connection setup message to the mobile terminal, and the mobile terminal sending an RRC connection setup complete message to the E-UTRAN.

As described above, the two main elements that comprise the E-UTRAN are the base station and the mobile terminal. The radio resources for a single cell are comprised of uplink radio resources and downlink radio resources. The base station is responsible for the allocation and control of uplink radio resources and downlink radio resources of a cell. Namely, the base station determines what radio resources are to be used by what mobile terminals at certain moments in time. For example, the base station can determine that 3.2 seconds from now, the frequency from 100 Mhz to 101 Mhz will be allocated to user 1 for a duration of 0.2 seconds to allow downlink data transmissions. Also, after the base station makes such determination, these matters can be informed to the corresponding mobile terminal such that this mobile terminal receives downlink data. Likewise, the base station can determine when a certain mobile terminal should use what amount of which radio resources for data transmission via the uplink, and the base station informs the mobile terminal about its determination, to thus allow the mobile terminal to transmit data during the determined time period using the determined radio resources.

Unlike the related art, if the base station manages radio resources in a dynamic manner, efficient use of radio resources would be possible. Typically, a single mobile terminal continuously uses a single radio resource during a call connection. This is not preferable considering that most recent services are IP packet-based. The reason is that most packet services do not continuously generate packets during the duration of a call connection, and there are many time periods in which nothing is transmitted during the call. Despite this, continued allocation of a radio resource to a single mobile terminal is inefficient. To solve this, the mobile terminal of a E-UTRAN system uses a method in which radio resources are allocated to the mobile terminal only while service data exists.

Figure 7:
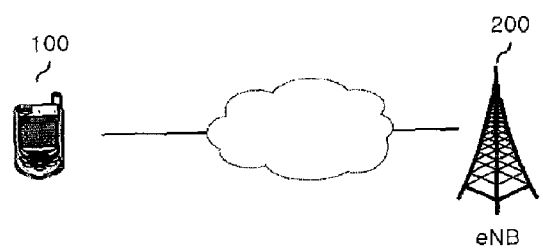
FIG. 7 shows how a UE and eNB (base station) are connected.
Figure 8:
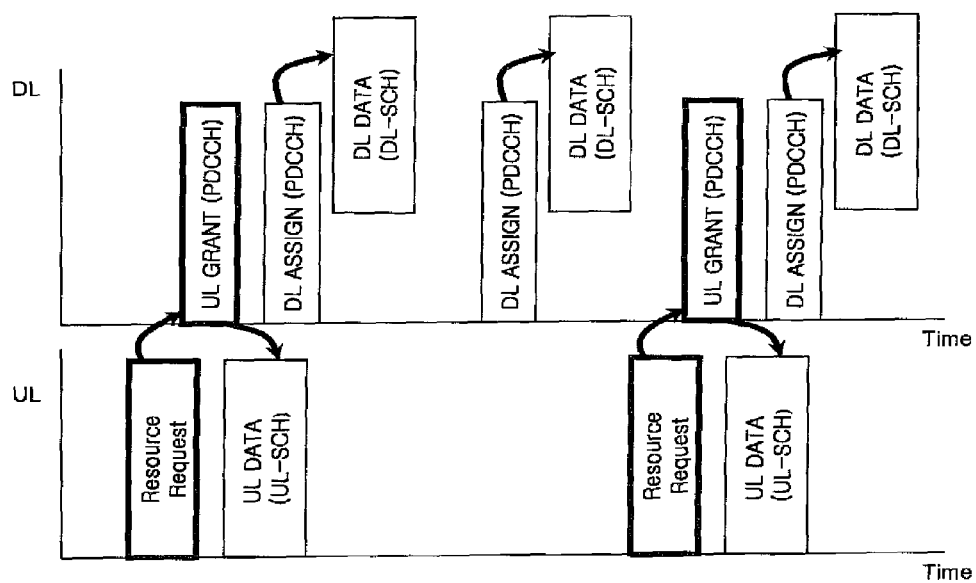
FIG. 8 shows an exemplary radio resource allocation according to the first embodiment.

FIGS. 7 and 8 show how a UE and eNB (base station) are connected, and show an exemplary radio resource allocation according to the first embodiment.

If the UE 100 has some data that it needs to transmit, a resource request message is used to inform the base station 200 (eNB: enhanced Node B) that there is data to be transmitted, and the eNB 200 delivers a resource allocation message to the UE 100.

When the UE 100 informs the eNB 200 that it has some data to transmit, the amount of data accumulated in the buffer of the MAC layer is reported to the eNB 200, and such reporting is called buffer status report (BSR) procedure.

For the LTE system, in order to use radio resources efficiently, the base station needs to know about the type and amount of data that is desired for transmission per each user. Downlink data is delivered from the access gateway to the base station. Thus, the base station knows about the amount of data that needs to be delivered via the downlink for each user. For uplink data, if the mobile terminal itself does not inform the base station about the data it wishes to deliver via the uplink, the base station cannot know how much uplink radio resources are needed for each mobile terminal. Thus, in order to allow the base station to allocate uplink radio resource to the mobile station in an appropriate manner, each mobile terminal needs to provide the base station with information necessary to allow the base station to perform scheduling of radio resources.

To do so, if the mobile terminal has data that is needs to transmit, such is informed to the base station, which uses such information to deliver a resource allocation message to the mobile terminal.

In the above procedure, namely, when the mobile terminal has some data that it should transmit and when such matter is informed to the base station, the mobile terminal informs the base station about the amount of data accumulated in its buffer. This is referred to as a buffer status report (BSR).

However, the buffer status report is generated in the form of a MAC Control Element, then included into a MAC PDU, and transmitted from the mobile terminal to the base station. In other words, uplink radio resources are also needed for transmitting the buffer status report. This means that uplink radio resource allocation request information needs to be sent in order to transmit the buffer status report. When the buffer status report is generated, if uplink radio resources have been allocated, the mobile terminal immediately uses such uplink radio resources to transmit the buffer status report. Such procedure performed by the mobile terminal to transmit a buffer status report to the base station is referred to as a BSR procedure.

Such BSR procedure may be started (or triggered) in at least the following types of situations:
  with all buffers initially containing no data, when data newly arrives for a particular buffer;
  when data arrives at a buffer that is empty, and the priority of the logical channel related to such buffer is higher than that of the logical channel related to a buffer that previously had data;
  when a cell has changed.

However, after the BSR procedure is triggered, when allocation of uplink radio resources is received, if all data in the buffer could be transmitted using such radio resources but there are not enough radio resources to accommodate the addition of the BSR, the mobile terminal cancels the triggered BSR procedure.

In other words, when the mobile terminal has some data that it needs to transmit, allocation of radio resources should be requested via the BSR procedure, and thereafter, transmission of data is performed by using the allocated radio resources.

At some point in time, when there are radio resources having been allocated, in particular, when there exists a BSR that was triggered or when there exists some data to be transmitted for a logical channel, the mobile terminal at first includes the BSR in the allocated radio resources (i.e., the mobile terminal, first and foremost, uses the allocated radio resource for transmitting the BSR), and any remaining radio resources can then be used in transmitting data that exists for the logical channel(s).

In other words, when there is a MAC control element(s) to be transmitted and logical channel data also exists, the data related to the MAC control element(s) is transmitted first, before any logical channel data transmission. The MAC control element may include items such as the BSR. The MAC control element has different characteristics than upper layer data, i.e., data for each logical channel. Namely, from the viewpoint of the MAC entity, the data of each logical channel is not generated within the MAC entity, but rather, received from the upper layer(s). However, the MAC control element is generated within the MAC entity. Such MAC control element(s) serve the purpose of allowing the MAC entity to properly perform various functions. Thus, the MAC entity employs a MAC control element(s) to allow data to be properly delivered to the upper layer(s). For such reasons, a MAC control element(s) should be transmitted at higher priority when compared to the data of each logical channel.

The BSR procedure can be used by a mobile terminal only in connected mode, and idle mode mobile terminals cannot use the BSR procedure. Namely, when the mobile terminal is about to enter its connected mode from idle mode, the mobile terminal generates and transmits an RRC connection request message, but such RRC connection request message does not trigger the BSR procedure.

If the mobile terminal uses the CCCH, not only is the above-described RRC connection request message used, but also an RRC connection re-establishment request message can only be used. The RRC connection re-establishment request message is used by a mobile terminal in RRC connected mode for various situations, such as, when problems in signal quality is discovered, when problems arise in the RLC/PDCP protocol established in the mobile terminal, when a call connection is to be maintained upon re-establishing an RRC connection, and the like.

For example, if the user of a mobile terminal is making an on-going call in a particular cell A, but then moves or travels to a certain location (such as walking into an elevator), the signal environment can deteriorate. In such case, the mobile terminal searches for a new cell and attempts to access such new cell, and thus an RRC re-establishment connection request message needs to be sent.

In such procedure, the new cell that was searched may be the same cell (e.g. cell A mentioned above) that the mobile terminal previously accessing, or may be a completely different cell. However, the mobile terminal does not know about the type of cell that was newly searched, and due to this, assumes that such new cell does not have any information about such mobile terminal, and transmission of the RRC re-establishment connection message is performed. Thus, the mobile terminal cannot use the DCCH, but initially uses the CCCH to transmit the RRC re-establishment connection request message.

The mobile terminal that performs the RRC re-establishment connection procedure is in RRC connected mode. Thus, with respect to the radio resources allocated to the mobile terminal, if a BSR that has been triggered and an RRC re-establishment connection request message both exist, the mobile terminal first uses the allocated radio resources in order to transmit the triggered BSR, and then uses any remaining radio resources to transmit the RRC re-establishment connection request message.

However, the above procedure may result in some problems. The RRC re-establishment request procedure is used when the mobile terminal is faced with an abnormal situation. For example, if problems in signal quality occur and a call connection is in danger of being cut off, the RRC re-establishment request procedure is performed. In such situation, the RRC re-establishment request message being transmitted later than the BSR (i.e. radio resources are allocated for the RRC re-establishment request message is performed after that for the BSR) means that the RRC connection request message transmission takes more time to be performed. As a result, the RRC re-establishment procedure takes more time to complete, and the possibility of call disconnection increases.

Additionally, a message transmitted via the CCCH must go through the TM RLC, but such TM RLC does not have a function for separating such message. Thus, if the BSR is first included with respect to allocated radio resources, and if the remaining radio resources are insufficient for including the RRC re-establishment request message, such RRC re-establishment request message cannot be transmitted until new radio resource allocation is received at a later time. Also, because the remaining radio resources (although insufficient for use in sending the RRC re-establishment request message) are not used, this results in a waste of radio resources.

In order to solve such problems, with respect to generating and sending a MAC PDU by using the radio resources allocated to the mobile terminal, the level of priority between the buffer status report (BSR) and the established logical channels are defined, and thus specific procedures for more effectively, efficiently and quickly sending the data of each logical channel and buffer status report are proposed hereafter.

The priority of data to be transmitted via the CCCH may be set to be higher than the priority of buffer status data (BSR).

A MAC PDU may be generated by assuming that the priority of data to be transmitted via the CCCH is higher than the priority of buffer status data.

If radio resources have been allocated, the mobile terminal checks to see if there is any buffer status report (BSR) and data to be transmitted via each logical channel. Also, if buffer status report (BSR) exists and when data to be sent via the CCCH has accumulated, the radio resources, which were allocated for transmitting the data accumulated for the CCCH, are employed. Thereafter, if there is any remaining space in the allocated radio resources, such is sued to transmit the buffer status report (BSR).

Namely, if the mobile terminal has a CCCH SDU and also a BSR to be transmitted, the CCCH SDU is transmitted before the BSR.

Namely, if the mobile terminal has a CCCH SDU and also a BSR to be transmitted, radio resources are first allocated for the CCCH SSU and then radio resources are allocated for the BSR.

In the above procedure, having a higher priority means that, with respect to generating a MAC PDU using the radio resources allocated to the mobile terminal, the data or MAC control element for a logical channel having relatively high priority receive allocation of radio resource (or are included in the MAC PDU) before the data or MAC control element for a logical channel having relatively low priority.

As a result, with respect to performing uplink transmissions by the mobile terminal, CCCH data transmissions are given higher priority than other MAC control elements such that problems during a call and call disconnections are minimized.

Figure 9:
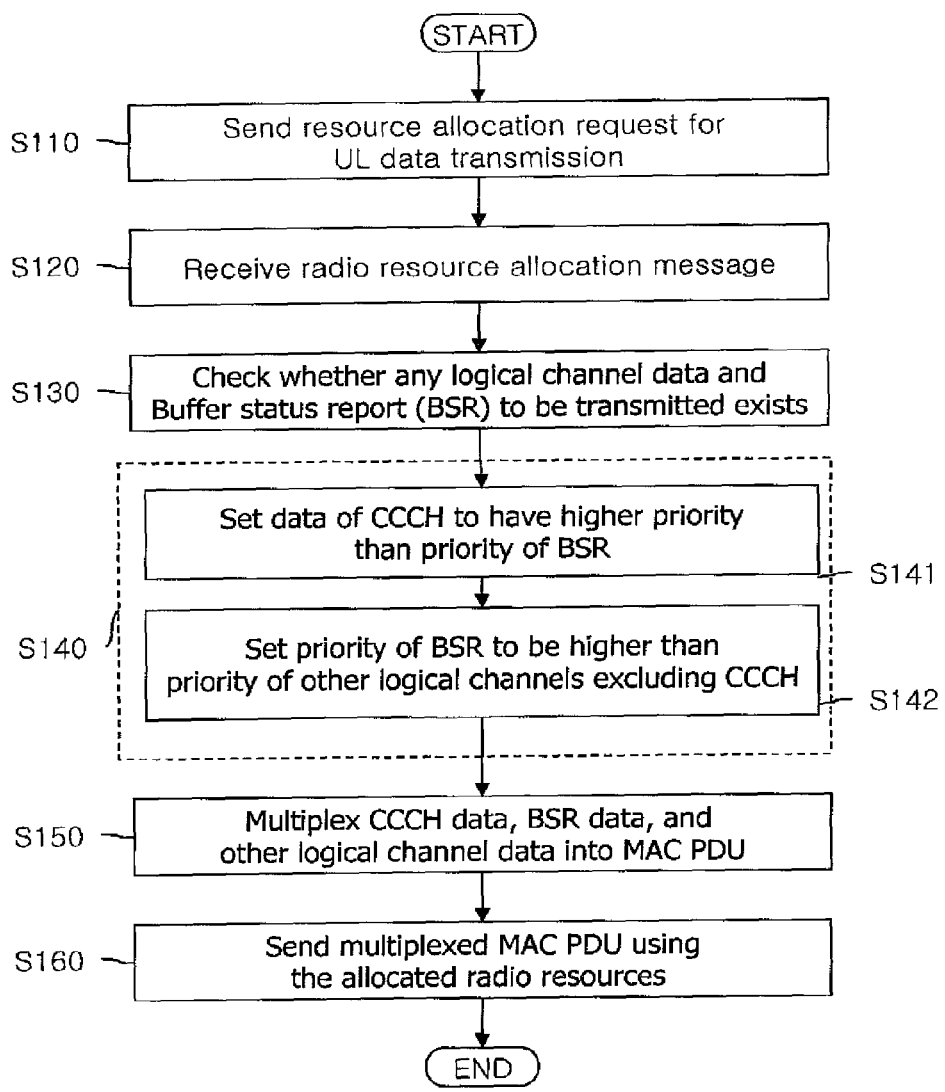
FIG. 9 shows an exemplary flow chart of the procedure for the second embodiment.

FIG. 9 shows an exemplary flow chart of the procedure for the second embodiment.

When the UE 100 uses its allocated radio resources to form (generate) and transmit a MAC PDU, the priority among the buffer status report (BSR) and logical channels is defined such that more effective, efficient and rapid transmission of logical channel data and BSR can be achieved.

A more detailed explanation will follow:

1) The UE 100 sends a resource allocation request for uplink (UL) data transmission (S110).

2) The eNB 200 allocated radio resources and transmits a message that indicates radio resource allocation (e.g. a Resource Allocation message) to the UE 100 (S120).

3) Upon allocation of resources, the UE 100 checks to see if there is a buffer status report (BSR) and data for each logical channel to be transmitted (S130).

4) The BSR and logical channel data to be transmitted are prioritized accordingly in decreasing order (S140).

Namely, when a BSR and logical channel data to be transmitted both exist, the priority for data accumulated for the CCCH (among the logical channels) is set to have higher priority than that of the BSR (S141). Then, the priority of the BSR is set to be higher than that for data of logical channels other than the CCCH (S142). When there are any radio resources that are available, such are used for transmitting the BSR.

5) The CCCH data, the BSR, and the other logical channel data are multiplexed into a MAC PDU (S150).

6) The multiplexed MAC PDU is transmitted by using the allocated radio resources (S160).

In determining the priorities for each logical channel, the UE 100 considers the following order:

First, the MAC control entity fir C-RNTI or UL-CCCH is considered.

Next, for padding, a MAC control entity for buffer status report excluding the BSR is considered.

Then, a MAC control entity for PBR (Prioritized Bit Rate) is considered.

Thereafter, logical channel data excluding the data from the UL-CCCH is considered.

Finally, the BSR included for padding is considered

The procedures described thus far may be implemented as software, hardware or any combination thereof. For example, the procedures described herein can be stored in a storage medium (e.g. internal memory, flash memory, hard disk, etc.)

in the form of codes or commands of a software program executed by a processor (e.g., a microprocessor within the UE).

Figure 10:
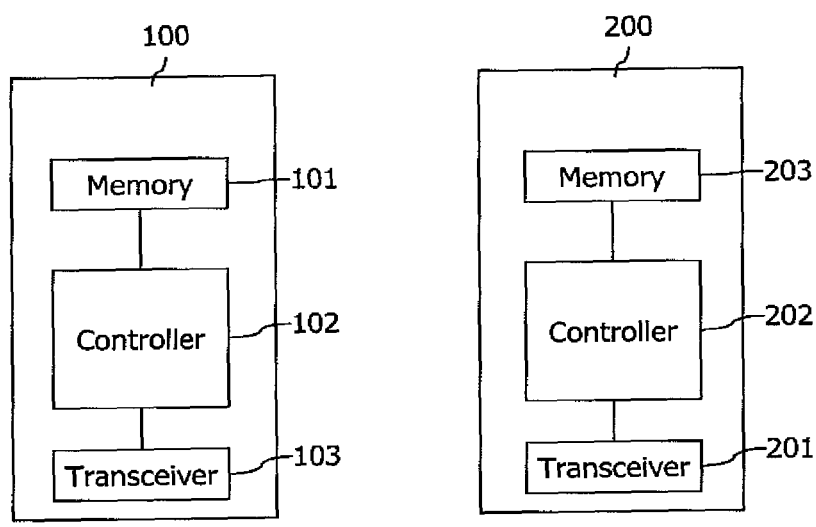
FIG. 10 shows the structural block diagram of a UE (100) and eNB (200) according to the exemplary embodiments.

FIG. 10 shows an exemplary structure block diagram of a UE (100) and eNB (200) according to the embodiments described herein.

The UE comprises a storage means (101), a control means (102) and a transceiver (103). Similarly, the eNB comprises a storage means (201), a control means (202) and a transceiver (203). Such storage means (101, 201) may be configured to store the procedures as shown in FIGS. 6 through 8 for the first and second embodiments. The control means (102, 202) provide control to the storage means (101, 201) and the transceivers (103, 203), such that the procedures stored in the storage means (101, 201) are performed with appropriate signal transmission and reception via the transceivers (103, 203).

Some more details about the concepts and features of the inventive embodiments described herein can also be summarized as follows.

The DRX Command MAC CE may be used to put a UE directly into either short or long DRX Cycle. But when a DRX Command MAC CE is received while the DRX Short Cycle Timer is running, the timer should not be affected. If the timer is started again (i.e. re-started), the UE is further put in wake-up state, causing more battery consumption. This situation can occur when HARQ Re-transmission Grant for a MAC PDU which includes the DRX Command MAC CE is received while the Short DRX Cycle Timer is running. Here, the terms "start" and "re-start" may be distinguished such that "start" is used when the timer is not running, while "re-start" is used when the timer is running. Thus, when the Short DRX Cycle Timer is running, it cannot be started, but it can be restarted.

However, such potential problem may be avoided by implementing the following concept: when DRX Command MAC CE is received while Short DRX Cycle Timer is running, the MAC CE is ignored.

The Active Time may include "a PDCCH indicating a new transmission addressed to the C-RNTI or Temporary C-RNTI of the UE has not been received after successful reception of a Random Access Response (RAR)." This would cover the period between the time of RAR reception and the time of starting the contention resolution timer. Otherwise, the UE would monitor the DL channels longer than needed. For example, even after the contention resolution timer expires due to reception of no temporary C-RNTI, the UE would still monitor the DL channels.

However, such potential problem may be avoided by implementing the following: setting the Active Time to include the period between the time of successful reception of RAR and the time of starting the Contention Resolution timer (for the case of contention-based preamble).

In other words, the situations for a contention-based preamble can be clarified as above. If UE has to wake up until the reception of C-RNTI regardless of other problems, the features described herein can be applied to situations for a dedicated preamble.

The maintenance of Uplink Time Alignment will be explained.

The UE may have a configurable Time Alignment Timer. The Time Alignment Timer is valid only in the cell for which it was configured and started.

If the Time Alignment Timer has been configured, the UE shall:
when a Timing Advance MAC control element is received:
apply the Timing Advance Command;
start the Time Alignment Timer (if not running) or restart the Time Alignment Timer (if already running).
when a Time Alignment Command is received in a Random Access Response message:
if the Random Access Preamble and PRACH resource were explicitly signalled:
apply the Time Alignment Command;
start the Time Alignment Timer (if not running) or restart the Time Alignment Timer (if already running).
else, if the Time Alignment Timer is not running or has expired:
apply the Time Alignment Command;
start the Time Alignment Timer;
when the contention resolution is considered not successful, stop the Time Alignment Timer.
else:
ignore the received Time Alignment Command.
when the Time Alignment Timer has expired or is not running:
prior to any uplink transmission, use the Random Access procedure in order to obtain uplink Time Alignment.
when the Time Alignment Timer expires:
release all PUCCH resources;
release any assigned SRS resources.

Discontinuous Reception (DRX) will be explained. The UE may be configured by the RRC with a DRX functionality that allows it to not continuously monitor the PDCCH. The DRX functionality consists of a Long DRX cycle, a DRX Inactivity Timer, a DRX Retransmission Timer, and optionally a Short DRX Cycle and a DRX Short Cycle Timer.

When a DRX cycle is configured, the Active Time includes the time:
while the On-Duration Timer or the DRX Inactivity Timer or a DRX Retransmission Timer or the Contention Resolution Timer is running; or
while a Scheduling Request is pending; or
while an uplink grant for a retransmission can occur; or
from the successful reception of a Random Access Response (RAR) to the starting of the Contention Resolution Timer.

Here, the Active Time can also be defined as:
while a PDCCH indicating a new transmission addressed to the C-RNTI of the UE has not been received after successful reception of a Random Access Response, if the Random Access Preamble was explicitly signaled; or
while the DL resuming timer is running. The DL resuming timer is started when successful RAR is received in case that the Random Access Preamble was explicitly signaled; (here, the DL resuming timer is stopped when the C-RNTI of the UE is received) (instead, it is also possible that the DL-resolution timer is started when a dedicated preamble is received over the PDCCH) or,
from the successful reception of a Random Access Response (RAR) to the starting of the Contention Resolution Timer, if the Random Access Preamble was selected by the UE MAC.

When a DRX cycle is configured, the UE shall perform the following procedures for each sub-frame:
start the On Duration Timer when [(SFN*10)+sub-frame number]modulo(current DRX Cycle)=DRX Start Offset;
if a HARQ RTT Timer expires in this sub-frame and the data in the soft buffer of the corresponding HARQ process was not successfully decoded:
start the DRX Retransmission Timer for the corresponding HARQ process.
if a DRX Command MAC control element is received:

stop the On Duration Timer;
stop the DRX Inactivity Timer.
if the DRX Inactivity Timer expires or a DRX Command MAC control element is received in this sub-frame:
if the short DRX cycle is configured:
if the DRX Short Cycle Timer is not running, start the DRX Short Cycle Timer;
use the Short DRX Cycle.
else:
use the Long DRX cycle.
if the DRX Short Cycle Timer expires in this sub-frame:
use the long DRX cycle.
during the Active Time, for a PDCCH-sub-frame except if the sub-frame is required for uplink transmission for half-duplex FDD UE operation:
monitor the PDCCH;
if the PDCCH indicates a DL transmission:
start the HARQ RTT Timer for the corresponding HARQ process;
stop the DRX Retransmission Timer for the corresponding HARQ process.
if the PDCCH indicates a new transmission (DL or UL):
start or restart the DRX Inactivity Timer.
if a DL assignment has been configured for this sub-frame and no PDCCH indicating a DL transmission was successfully decoded:
start the HARQ RTT Timer for the corresponding HARQ process.
when not in active time, CQI and SRS shall not be reported.
Regardless of whether the UE is monitoring PDCCH or not the UE receives and transmits HARQ feedback when such is expected.

The inventive embodiments described herein can further be described as follows.

For the Logical Channel Prioritization procedure, the UE shall take into account the following relative priority in decreasing order:
MAC control element for C-RNTI or data from UL-CCCH;
MAC control element for BSR, with exception of BSR included for padding;
MAC control element for PHR;
data from any Logical Channel, except data from UL-CCCH;
MAC control element for BSR included for padding.
The UE shall allocate resources to the logical channels in the following steps:
Step 1: All the logical channels with Bj>0 are allocated resources in a decreasing priority order. If the PBR of a radio bearer is set to "infinity", the UE shall allocate resources for all the data that is available for transmission on the radio bearer before meeting the PBR of the lower priority radio bearer(s);
Step 2: the UE shall decrement Bj by the total size of MAC SDUs served to logical channel j in Step 1
NOTE: The value of Bj can be negative.
Step 3: if any resources remain, all the logical channels are served in a strict decreasing priority order (regardless of the value of Bj) until either the data for that logical channel or the UL grant is exhausted, whichever comes first. Logical channels configured with equal priority should be served equally.
The Logical Channel Prioritization procedure is applied when a new transmission is performed.
RRC can control the scheduling of uplink data by giving each logical channel a priority where increasing priority values indicate lower priority levels. In addition, each logical channel is given a Prioritized Bit Rate (PBR).

The UE shall perform the following Logical Channel Prioritization procedure when a new transmission is performed:
The UE shall allocate resources to the logical channels in the following sequence:
all the logical channels are allocated resources in a decreasing priority order up to a value such that on average, the served data rate for radio bearers that have data for transmission equals the configured PBR for the radio bearer. If the PBR of a radio bearer is set to "infinity", the UE shall allocate resources for all the data that is available for transmission on the radio bearer before meeting the PBR of the lower priority radio bearer(s);
if any resources remain, all the logical channels are served in a strict decreasing priority order until either the data for that logical channel or the UL grant is exhausted, whichever comes first.
The UE shall also follow the rules below during the scheduling procedures above:
the UE should not segment an RLC SDU (or partially transmitted SDU or retransmitted RLC PDU) if the whole SDU (or partially transmitted SDU or retransmitted RLC PDU) fits into the remaining resources;
if the UE segments an RLC SDU from the logical channel, it shall maximize the size of the segment to fill the grant as much as possible;
the UE shall serve as much data as it can to fill the grant in general.
However, if the remaining resources require the UE to segment an RLC SDU with size smaller than x bytes or smaller than the L2 header size (FFS), the UE may use padding to fill the remaining resources instead of segmenting the RLC SDU and sending the segment.

Logical channels configured with the same priority shall be served equally the by UE.

MAC control elements for BSR, with exception of Padding BSR, have higher priority than U-plane Logical Channels.

At serving cell change, the first UL-DCCH MAC SDU to be transmitted in the new cell has higher priority than MAC control elements for BSR.

UL-CCCH MAC SDU to be transmitted has higher priority than MAC control elements for BSR.

The inventive features described herein can be summarized as follows.

A method of assembling a Medium Access Control (MAC) Protocol Data Unit (PDU), the method comprising: allocating resources for all data available for transmission on a common control channel (CCCH), then allocating resources for all data available for transmission of a buffer status report (BSR), and then allocating resources for all data available for transmission on logical channels other than the CCCH; and combining at least one of the data for the CCCH, the data for the BSR, and the data for other logical channels other than the CCCH to form a MAC PDU to be transmitted. A priority of data for the CCCH among all logical channels is higher than a priority of the BSR, and the priority of the BSR is higher than a priority of data for other logical channels other than the CCCH. The data of the CCCH comprises a radio resource control (RRC) re-establishment request message.

A method of transmitting a Medium Access Control (MAC) Protocol Data Unit (PDU), the method performed by a mobile terminal and comprising: requesting, to a network, allocation of resources for uplink transmissions, wherein the requesting is performed by using a RACH (Random Access CHannel) procedure; receiving, from the network, allocation of resources for new transmissions; allocating resources to logical channels for the new transmissions, wherein all logical channels are allocated resources in a decreasing priority order, such that data from a CCCH has higher priority than a buffer status report (BSR) and the BSR has higher priority than data from other logical channels excluding the CCCH; multiplexing at least one of the data from the CCCH, the BSR, and the data from other logical channels excluding the CCCH into a MAC PDU to generate a multiplexed MAC PDU; and transmitting, to the network, the multiplexed MAC PDU using the allocated resources. If the mobile terminal changes to a new cell, a first DCCH (Dedicated Control Channel) MAC SDU (Service Data Unit) transmitted from the new cell is given higher priority than a MAC control element for the BSR. The data of the CCCH comprises a radio resource control (RRC) re-establishment request message. The requesting allocation of resources is performed with respect to a new cell.

A mobile terminal comprising: a transceiver configured to request allocation of resources for uplink transmissions, wherein the request uses a RACH procedure, and to receive allocation of resources for new transmissions; and a processor configured to cooperate with the transceiver and to allocate the resources to logical channels for the new transmissions, wherein all logical channels are allocated resources in a decreasing priority order, data from a CCCH has higher priority than a buffer status report (BSR) and the BSR has higher priority than data from other logical channels excluding the CCCH, to multiplex at least one of the data from CCCH, the BSR, and the data from other logical channels excluding the CCCH into a MAC PDU to generate a multiplexed MAC PDU, and to transmit the multiplexed MAC PDU using the allocated resources. If the mobile terminal changes to a new cell, a first DCCH (Dedicated Control Channel) MAC SDU (Service Data Unit) transmitted from the new cell has higher priority than a MAC control element for the BSR. The data of the CCCH comprises a radio resource control (RRC) re-establishment request message. The requesting allocation of resources is performed with respect to a new cell.

The various features and concepts described herein may be implemented in software, hardware, or a combination thereof. For example, a computer program (that is executed in a computer, a terminal or a network device) for a method and system for handling buffer status report (BSR) priority for CCCH transmissions may comprise one or more program code sections for performing various tasks. Similarly, a software tool (that is executed in a computer, a terminal or a network device) for a method and system for handling buffer status report (BSR) priority for CCCH transmissions may comprise program code portions for performing various tasks.

The method and system for processing buffer status reports (BSRs) according to the present invention are compatible with various types of technologies and standards. Certain concepts described herein are related to various types of standards, such as GSM, WCDMA, 3GPP, LTE, IEEE, 4G and the like. However, it can be understood that the above exemplary standards are not intended to be limited, as other related standards and technologies would also be applicable to the various features and concepts described herein.

Industrial Applicability

The features and concepts herein are applicable to and can be implemented in various types of user devices (e.g., mobile terminals, handsets, wireless communication devices, etc.) and/or network entities that can be configured to support handling buffer status report (BSR) priority for CCCH transmissions.

As the various concepts and features described herein may be embodied in several forms without departing from the characteristics thereof, it should also be understood that the above-described embodiments are not limited by any of the details of the foregoing description, unless otherwise specified, but rather should be construed broadly within its scope as defined in the appended claims. Therefore, all changes and modifications that fall within such scope or equivalents thereof are therefore intended to be embraced by the appended claims.

The invention claimed is:

1. A method of assembling a Medium Access Control (MAC) Protocol Data Unit (PDU), the method comprising:
   allocating resources for data from a uplink-common control channel (UL-CCCH) and data from one or more logical channels other than the UL-CCCH; and
   multiplexing the data from the UL-CCCH, the data from the one or more logical channels other than the UL-CCCH and MAC control element for a buffer status report (BSR) to form a MAC PDU for a new transmission,
   wherein the data from the UL-CCCH has higher priority than the MAC control element for BSR.

2. The method of claim 1, wherein if the MAC control element for the BSR is not for padding, the MAC control element for the BSR has higher priority than the one more logical channels other than the UL-CCCH.

3. The method of claim 1, wherein the data for the UL-CCCH comprises a radio resource control (RRC) re-establishment request message.

4. A method of assembling a Medium Access Control (MAC) Protocol Data Unit (PDU), the method comprising:
   allocating radio resources to logical channels for new transmission by using a priority order, and
   multiplexing data from common control channel (CCCH) and MAC control element for a buffer status report (BSR) into a MAC PDU;
   wherein the priority order satisfying that a priority of the data from the CCCH is higher than a priority of the MAC control element for BSR.

* * * * *